Oct. 5, 1971     ICHIRO WADA     3,610,040

ELECTROMAGNETIC FLOWMETER

Filed March 31, 1970     2 Sheets-Sheet 1

INVENTOR
ICHIRO WADA

BY Oblon, Fisher & Spivak

ATTORNEYS

Oct. 5, 1971  ICHIRO WADA  3,610,040
ELECTROMAGNETIC FLOWMETER
Filed March 31, 1970  2 Sheets-Sheet 2

INVENTOR
ICHIRO WADA

BY Oblon, Fisher & Spivak
ATTORNEYS

United States Patent Office 3,610,040
Patented Oct. 5, 1971

3,610,040
ELECTROMAGNETIC FLOWMETER
Ichiro Wada, Yokohama, Japan, assignor to Tokyo Shibaura Electric Co., Ltd., Kawasaki-shi, Japan
Filed Mar. 31, 1970, Ser. No. 24,158
Int. Cl. G01p 5/08
U.S. Cl. 73—194 EM                11 Claims

ABSTRACT OF THE DISCLOSURE

An electromagnetic flowmeter includes a conduit for passing therethrough a fluid, the rate of which is to be measured. The conduit includes a pair of electrodes and exciting coils surrounding the conduit for creating a magnetic flux in a core assembly formed of a pair of symmetrically matched core elements, the poles of which are joined at a substantially centered position along the excitation axis. Magnetic shielding is placed around the exciting coils. An outer casing is provided and includes flange elements at the ends thereof for enabling connections to a pipeline to be made. An electromotive force will be generated in the pair of electrodes within the conduit and the same will be proportional to the rate of flow of the fluid passing through the conduit.

BACKGROUND OF THE INVENTION

Field of the invention

The present invention generally relates to electromagnetic flowmeters and more particularly to a unique electromagnetic flowmeter having minimum leakage and eddy current losses such that accurate measurements of the rate of flow of a fluid passing through a pipeline in a chemical plant or the like can be readily made.

Description of prior art

In the past, electromagnetic flowmeters have been employed for enabling measurements to be made of the rate of flow of a fluid in a pipeline in a chemical plant or the like so that desired flow rates could be maintained. Such prior art electromagnetic flowmeters conventionally utilize a small diameter conduit of a non-magnetic material and have a magnetic flux applied thereacross which will induce differing amounts of electromotive force across a pair of electrodes situated within the conduit, the same being proportional to the rate of flow of the fluid passing through the conduit.

While generally somewhat satisfactory, the prior art electromagnetic flowmeters were constructed in such a fashion that a certain amount of the magnetic flux across the conduit would leak from the flowmeter assembly and thereby introduce an element of error in the rate of flow measurement. This error results from the fact that the electromotive force generated in the conduit electrodes, which is proportional to the rate of flow measurement of the fluid therein, will be in error by a factor related to the magnetic flux leakage.

Moreover, in the prior art electromagnetic flowmeters, there being no magnetic shielding surrounding the magnetic flux exciting coils, a substantial amount of magnetic flux would leak into the flowmeter housing and thereby cause eddy current losses which again would introduce an element of error into the rate of flow measurement and also destroy the linearity of the electromotive force developed across the measuring electrodes mounted within the conduit wall.

Furthermore, the prior art electromagnetic flowmeters were generally complex and difficult to assemble and accordingly, quite expensive.

SUMMARY OF THE INVENTION

Accordingly, one object of the present invention is the provision of a unique electromagnetic flowmeter.

Another object of the subject invention is to provide a new and improved electromagnetic flowmeter which provides for linear and uniform output measurements in accordance with the changes in rate of flow of a fluid passing through a conduit.

A further object of this invention is the provision of a new and improved unique electromagnetic flowmeter, wherein the magnetic core surrounding the fluid flowing conduit includes a pair of symmetrically matched core elements, the poles of which are aligned at a substantially centered position along the excitation axis in such a fashion that leakage flux is minimized.

A still further object of this invention is the provision of a new and improved electromagnetic flowmeter wherein the magnetic flux exciting coils are magnetically shielded so as to reduce eddy current losses in the retaining ring and outer casing thereof.

One other object of the subject invention is the provision of a unique electromagnetic flowmeter which is symmetrical, easy to construct, compact and inexpensive.

Briefly, in accordance with this invention, the foregoing and other objects are in one aspect attained by utilizing a magnetic core assembly formed of a pair of symmetrically matched core elements which are joined at the respective poles thereof along a substantially centered position of the excitation axis. The pair of core elements surround a conduit through which a fluid whose rate is to be measured flows. Magnetically shielded exciting coils are provided to produce a magnetic flux within the core assembly such that an electromotive force will be induced in a pair of electrodes within the fluid flowing conduit in an amount proportional to the rate of flow of the fluid.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 1:
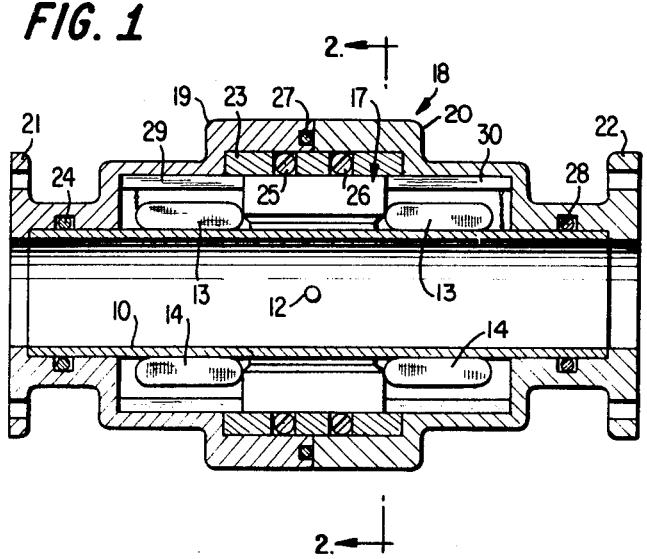
FIG. 1 is a longitudinal sectional view of a preferred embodiment of the electromagnetic flowmeter according to the present invention.

Referring now to the drawings, wherein like reefrence numerals designate identical, or corresponding parts throughout the several views, and more particularly to FIGS. 1 through 4 thereof wherein the electromagnetic flowmeter according to the present invention is shown as including a conduit 10 of relatively small diameter, such, for example, as 50 to 60 millimeters, for enabling a fluid whose rate of flow is to be measured to be passed therethrough. The conduit 10 may be typically made of a non-magnetic material, such, for example, as a synthetic resin, a non-magnetic steel, aluminum, bronze, brass, and the like. A pair of conventional electrodes 11 and 12 are oppositely positioned along a diameter 31 (shown by a dotted line) of the conduit 10 and the electrodes 11 and 12 are extended through the side walls of the conduit 10 in such a fashion as to provide a fluid tight seal. It should be understood that if the conduit 10 should be made of a metallic material, that the electrodes 11 and 12 should be electrically insulated from the side walls of the conduit in a conventional manner so as to avoid a short circuiting of the electrode pair.

As clearly seen in FIGS. 1 through 4, there are also provided two pairs of A.C. exciting coils 13 and 14 which are conventionally excited from a stabilized alternating current source (not shown). The A.C. exciting coils 13 and 14 are wound in a desired form and are positioned about the external surface of the conduit 10 such that their exciting axis is perpendicular to the diameter 31. The A.C. exciting coils 13 and 14 are integrally secured to the external surface of the conduit 10 by the employment of a suitable adhesive or the like and are of a height substantially equal to the diameter of the conduit 10.

Figure 2:
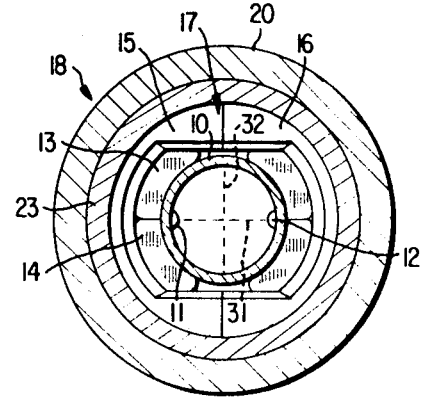
FIG. 2 is a cross-sectional view taken along the line 2—2 of FIG. 1, as seen by looking in the direction of the arrows.
Figure 3:
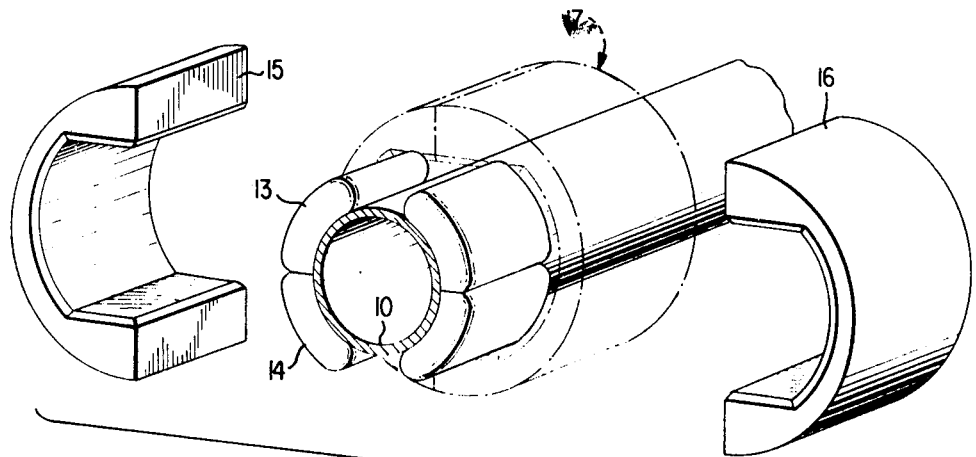
FIG. 3 is an exploded view showing the conduit, one pair of A.C. exciting coils and the pair of surrounding core elements of the electromagnetic flowmeter according to the present invention.

Referring now to FIG. 3, it can be seen that a pair of symmetrically matched and axially laminated magnetic core elements 15 and 16 are mounted on opposite sides of the conduit 10 and surround conduit 10 at a point adjacent to the A.C. exciting coils 13 and 14. The actual mounted position of the core elements 15 and 16 (shown in phantom) forms a centered core assembly 17. It should also be apparent as shown in FIGS. 2, 3, and 4, that the joining of the matched core elements 15 and 16 occurs along a diameter 32 (shown as a dotted line) of the conduit 10 and that the same is perpendicular to the diameter 31 which extends through the pair of electrodes 11 and 12.

Referring again to FIG. 4, it can be seen that when the pairs of coils 13 and 14 are excited from the stabilized alternating current source (not shown), that a magnetic flux will be generated in a direction as shown by the arrows. The magnetic flux so generated will flow on each side of the core assembly 17 in a uniform and parallelly distributed fashion between the oppositely disposed electrodes 11 and 12.

Figure 4:
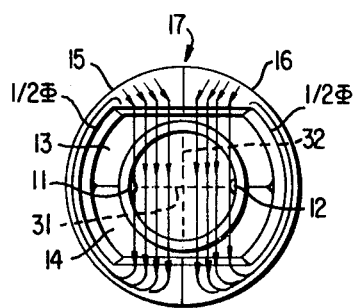
FIG. 4 is a cross-sectional view showing the flux paths for the magnetic flux produced in the core assembly by exciting the pair of exciting coils.

Now, in operation, when it is desired to measure the rate of flow of a fluid passing through a pipeline in a chemical plant or the like, the fluid under measurement will be passed through the conduit 10 across which a uniform region of magnetic flux will exist, as shown in FIG. 4. Depending upon the rate of flow of the fluid in the conduit, an electromotive force will be induced in the pair of electrodes 11 and 12 in an amount proportional to the rate of flow. In accordance with the measured amount of electromotive force induced in the electrodes 11 and 12, proper adjustments to the rate of flow so as to maintain a desired condition can be readily made.

It should be understood that because of the unique arrangement of the core assembly 17, wherein a pair of symmetrically matched core elements 15 and 16 have their poles aligned at a substantially centered position along the excitation axis that magnetic flux leakage will be at a minimum and as a result highly accurate rate of flow measurements can be realized.

Referring again to FIGS. 1 and 2, it can be seen that a retaining ring 23 is placed around the core assembly 17 to hold the two core elements 15 and 16 at their desired relative positions.

The core assembly 17 and retaining ring 23 is mounted within a tubular type outer casing 18 which includes two portions 19 and 20 that are axially combined with each other and sealed at their joining location by the use of O-rings 27 or the like. Additional O-rings, such, for example, as O-rings 24, 25, 26 and 28 or the like may be provided for the purpose of establishing packing. Each end of the outer casing 18 has a flange member attached thereto, such, for example, as flanges 21 and 22, for securing the flowmeter to a pipeline which passes the fluid under measurement. Additionally, magnetic shields 29 and 30, which are formed of spirally-wound cores, are placed within the respective casing portions 19 and 20 and surround the ends of the coils 13 and 14.

It has been found that by the use of the magnetic shields 29 and 30, magnetic flux leakage in the retaining ring 23 and the outer casing 18, which could be caused by leakage at the ends of the coils 13 and 14, and thereby cause eddy current losses, is reduced to a minimum. As a result, any error caused by such leakage is minimized and a linear and accurate rate of flow measurement can be made across the electrodes 11 and 12. Additionally, it has been found that by the use of magnetic shields 29 and 30, the distribution of magnetic flux flowing in the region of the conduit 10, as shown in FIG. 4, will be highly uniform. Such a uniformity, would be equivalent to increasing the axial length of the core assembly 17 and thereby increases the accuracy of the output signal of the electromagnetic flowmeter taken across the electrodes 11 and 12.

Figure 5:
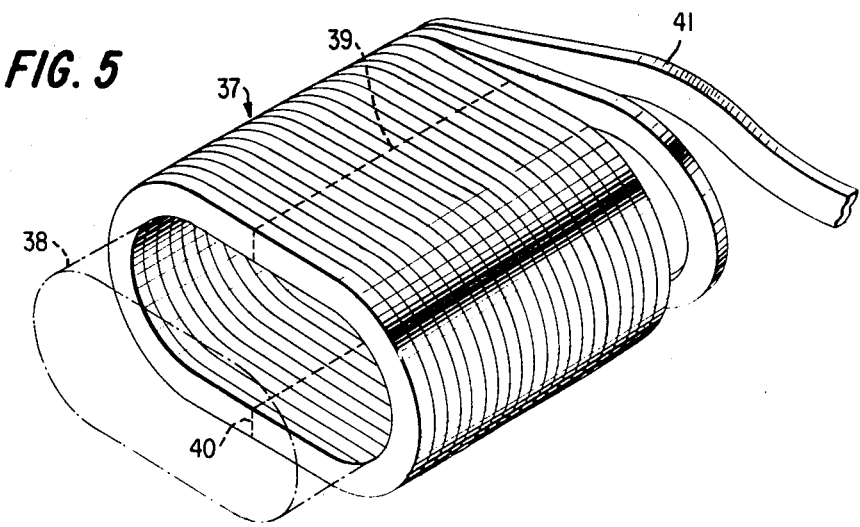
FIGS. 5, 6, and 7 are perspective views of alternative types of core elements which can be utilized in accordance with the teachings of the present invention.
Figure 6:
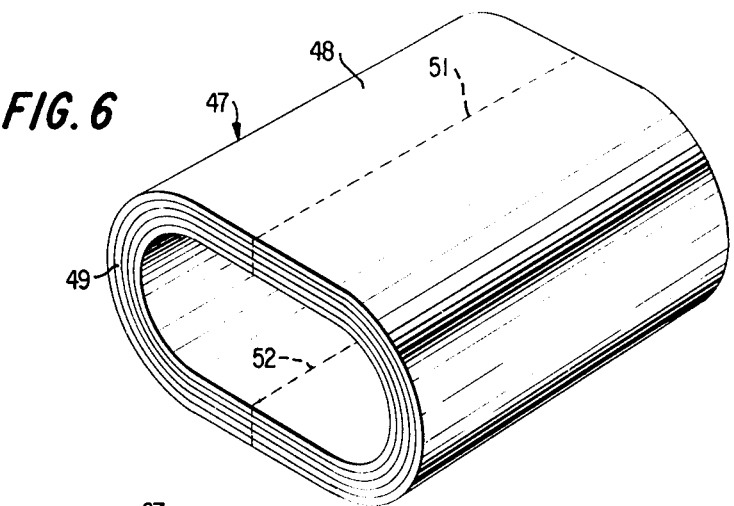
Figure 7:
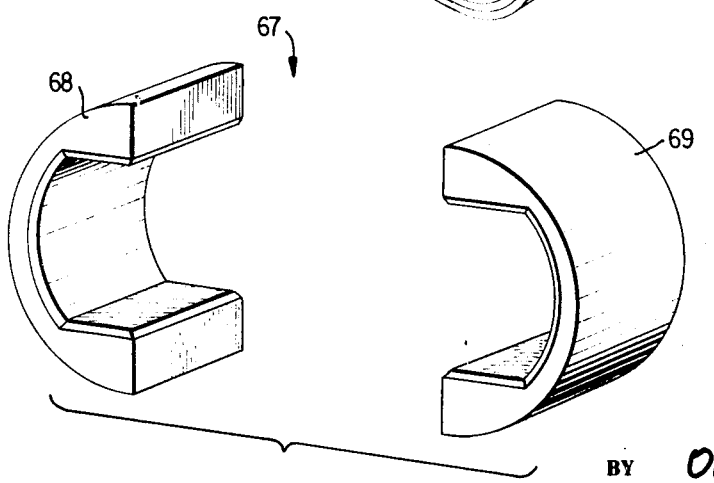

Referring now to FIGS. 5 through 7, various alternative arrangements for the magnetic core assembly are shown. In particular, FIG. 5 shows an edge-wise core assembly 37 suitable for use in the electromagnetic flowmeter of the present invention which is formed by winding a web-like magnetic material 41 around a mandrel 38 (shown in phantom) and the pair of symmetrically matched core elements can be formed by cutting along the center surfaces 39 and 40. Likewise, FIG. 6 shows a flat-wise wound core assembly 47 suitable for use with an electromagnetic flowmeter according to the present invention and may be formed by winding a web-like material 48 and then dividing the same into two core elements 49 and 50 by cutting along the surfaces shown as 51 and 52. By way of further example, FIG. 7 discloses a core assembly 67 suitable for use in an electromagnetic flowmeter according to the present invention wherein the pair of symmetrically matched core elements 68 and 69 are of a single ferrite material instead of being formed of axially laminated elements as shown in FIG. 3.

It should now be apparent that the electromagnetic flowmeter of the herein-described invention provides for the highly accurate and linear measurement of the rate of flow of a fluid passed through a conduit and wherein errors due to magnetic flux leakage and eddy current losses are at a minimum.

Obviously, numerous modifications and variations of the present invention are possible in light of the above teachings. It is therefore understood that within the scope of the appended claims, the invention may be practiced otherwise than as specifically described herein.

What is claimed as new and desired to be secured by Letters Patent of the United States is:

1. An electromagnetic flowmeter comprising:
   a conduit having an inner surface and an outer surface, said conduit receiving and having passed therethrough a fluid, the rate of flow of which is to be measured;
   a pair of electrodes positioned at opposite sides of said conduit;
   a core assembly mounted around said outer surface of said conduit, said core assembly including a pair of symmetrically matched core elements, the poles of which are aligned at a substantially centered position along the excitation axis;
   coil means positioned on said conduit on opposite sides of said core assembly and when excited producing a magnetic flux in said conduit which will generate an electromotive force in said pair of electrodes proportional to the rate of flow of said fluid, said magnetic flux within said conduit being perpendicular to a diameter of said conduit passing between said electrodes; and
   an outer casing for housing said core assembly.

2. An electromagnetic flowmeter as in claim 1, wherein each said coil means comprises a pair of coils surrounded by a separate magnetic shield whereby magnetic flux leakage which could cause eddy current losses is minimized.

3. An electromagnetic flowmeter as in claim 2, wherein each of said magnetic shields is a spirally-wound core.

4. An electromagnetic flowmeter as in claim 3, wherein said conduit is of a non-magnetic material.

5. An electromagnetic flowmeter as in claim 4, wherein a retaining ring is provided for holding said pair of core elements of said core assembly together, and,
   wherein said outer casing includes two axially connected tubular portions.

6. An electromagnetic flowmeter as in claim 5, wherein a flange element is provided at each end of said outer casing for enabling connections to a pipeline to be readily made.

7. An electromagnetic flowmeter as in claim 6, wherein a plurality of O-rings are provided for sealing said outer casing.

8. An electromagnetic flowmeter as in claim 4, wherein said pair of core elements of said core assembly are axially laminated.

9. An electromagnetic flowmeter as in claim 4, wherein said core assembly is formed of a coil of wire having a rectangular cross section, said coil divided into equal parts along its longitudinal axis.

10. An electromagnetic flowmeter as in claim 4, wherein said core assembly is formed of a coil of sheet material divided into equal parts along its longitudinal axis.

11. An electromagnetic flowmeter as in claim 4, wherein said pair of core elements of said core assembly are of the ferrite type.

References Cited

UNITED STATES PATENTS

| 3,108,474 | 10/1963 | Sasaki et al. | 73—194 EM |
| 3,334,518 | 8/1967 | Miyamichi | 73—194 EM |
| 3,527,095 | 9/1970 | Wada | 73—194 EM |

FOREIGN PATENTS

| 798,997 | 11/1968 | Canada | 73—194 EM |
| 1,072,521 | 6/1967 | Great Britain | 73—194 EM |

CHARLES A. RUEHL, Primary Examiner